(12) United States Patent
Bickel et al.

(10) Patent No.: US 8,204,886 B2
(45) Date of Patent: Jun. 19, 2012

(54) METHOD AND APPARATUS FOR PREPARATION OF INDEXING STRUCTURES FOR DETERMINING SIMILAR POINTS-OF-INTERESTS

(75) Inventors: Steffen Bickel, Nidderau (DE); Hannes Kruppa, Berlin (DE); Peter Siemen, Berlin (DE); Mark Waldaukat, Berlin (DE)

(73) Assignee: Nokia Corporation, Espoo (FI)

( * ) Notice: Subject to any disclaimer, the term of this patent is extended or adjusted under 35 U.S.C. 154(b) by 231 days.

(21) Appl. No.: 12/614,037

(22) Filed: Nov. 6, 2009

(65) Prior Publication Data
US 2011/0113040 A1   May 12, 2011

(51) Int. Cl.
*G06F 17/30* (2006.01)
(52) U.S. Cl. ............... 707/741; 707/749
(58) Field of Classification Search .......... 707/706–759, 707/763
See application file for complete search history.

(56) References Cited

U.S. PATENT DOCUMENTS

| | | | |
|---|---|---|---|
| 7,257,570 B2 | 8/2007 | Riise et al. | |
| 7,689,621 B1* | 3/2010 | Huber et al. | 707/743 |
| 2004/0073538 A1* | 4/2004 | Leishman et al. | 707/3 |
| 2005/0196015 A1* | 9/2005 | Luo et al. | 382/103 |
| 2005/0222829 A1* | 10/2005 | Dumas | 703/2 |
| 2005/0222879 A1* | 10/2005 | Dumas et al. | 705/5 |
| 2005/0278378 A1* | 12/2005 | Frank | 707/104.1 |
| 2006/0147099 A1* | 7/2006 | Marshall et al. | 382/128 |
| 2006/0200309 A1 | 9/2006 | Yu et al. | |
| 2006/0287810 A1 | 12/2006 | Sadri et al. | |
| 2006/0287815 A1* | 12/2006 | Gluck | 701/208 |
| 2007/0025606 A1* | 2/2007 | Gholap et al. | 382/128 |
| 2007/0219706 A1 | 9/2007 | Sheynblat | |
| 2007/0288219 A1* | 12/2007 | Zafar et al. | 703/14 |
| 2008/0104005 A1* | 5/2008 | Dalton | 706/45 |
| 2008/0154829 A1* | 6/2008 | Dalton | 706/46 |
| 2008/0159590 A1* | 7/2008 | Yi et al. | 382/103 |
| 2008/0256044 A1* | 10/2008 | Anderson et al. | 707/3 |
| 2008/0268876 A1* | 10/2008 | Gelfand et al. | 455/457 |
| 2009/0128546 A1* | 5/2009 | Masuda | 345/419 |
| 2009/0177384 A1 | 7/2009 | Walder | |
| 2009/0265340 A1* | 10/2009 | Barcklay et al. | 707/5 |
| 2010/0153292 A1* | 6/2010 | Zheng et al. | 705/347 |
| 2010/0191722 A1* | 7/2010 | Boiman et al. | 707/723 |
| 2010/0195914 A1* | 8/2010 | Isard et al. | 382/201 |
| 2010/0241507 A1* | 9/2010 | Quinn et al. | 705/14.42 |
| 2010/0250619 A1* | 9/2010 | Hulubei | 707/803 |
| 2010/0325127 A1* | 12/2010 | Chaudhuri et al. | 707/759 |
| 2011/0093458 A1* | 4/2011 | Zheng et al. | 707/724 |

FOREIGN PATENT DOCUMENTS

| | | |
|---|---|---|
| CN | 101388023 A | 3/2009 |
| WO | WO 02/50495 A2 | 6/2002 |

* cited by examiner

*Primary Examiner* — Hanh Thai
(74) *Attorney, Agent, or Firm* — Ditthavong Mori & Steiner, P.C.

(57) ABSTRACT

An approach is provided for determining the similarity between two points-of-interest. Data about a plurality of features of each of a plurality of points-of-interest are received. A feature vector is created based on the respective features for each of the points-of-interest. A geospatial index comprising the feature vectors and associated location data for each of the points-of-interest is generated.

17 Claims, 13 Drawing Sheets

FIG. 5

MAPPING STRUCTURE

- FOOD AND DRINK 501
  - BAR 505
  - RESTAURANT 503
    - ASIAN 507
      - JAPANESE 509
      - THAI 511
      - CHINESE 513

PLACE XYZ 515
- CATEGORIES
- TAGS
- RATINGS
- PRICE
- TEXT DESCRIPTION
- USER REVIEWS

MAPPING CATEGORIES TO FEATURE VECTOR

| FEATURE VECTOR 517 | |
|---|---|
| DESCRIPTION | VALUE |
| BAR | 0 |
| RESTAURANT | 1 |
| ASIAN | 1 |
| THAI | 0 |
| CHINESE | 1 |
| ... | ... |

FIG. 9

| WEIGHTING VECTOR 900 ||
|---|---|
| DESCRIPTION | VALUE |
| BAR | 2 |
| RESTAURANT | 2 |
| ASIAN | 3 |
| THAI | 6 |
| CHINESE | 6 |
| ... | ... |
| ATMOSPHERE | .5 |
| FRIENDLY OWNER | .5 |
| LIVE MUSIC | 2 |
| ATM | .5 |
| ... | ... |
| RATING | .2 |
| PRICE 15-25 | 1 |
| PRICE 25-35 | 2 |
| ... | ... |
| ARLINGTON | .2 |
| BEER | .2 |
| FAVORITE | 1 |
| HOME | .3 |
| ... | ... |

901 — BAR through CHINESE
903 — ATMOSPHERE through ATM
907 — RATING
909 — PRICE 15-25, PRICE 25-35
905 — ARLINGTON through HOME

METHOD AND APPARATUS FOR PREPARATION OF INDEXING STRUCTURES FOR DETERMINING SIMILAR POINTS-OF-INTERESTS

BACKGROUND

Service providers (e.g., wireless, cellular, etc.) and device manufacturers are continually challenged to deliver value and convenience to consumers by, for example, providing compelling location services. Such services can include navigation and local area search services. However, the traditional search options available to consumers require a variety of information to be inputted by the consumer. Thus, in traditional search schemes, the number of input options available to the consumers may be confusing because of the number of input options available. Thus, many consumers may not use available navigation and local searching services because these services are difficult for the consumer to understand.

SOME EXAMPLE EMBODIMENTS

According to one embodiment, a method comprises receiving data about a plurality of features for each of a plurality of points-of-interest. The method also comprises creating, based on the respective features, a feature vector for each of the points-of-interest. The method further generating a geospatial index comprising the feature vectors and associated location data for each of the points-of-interest.

According to another embodiment, an apparatus comprising at least one processor, and at least one memory including computer program code, the at least one memory and the computer program code configured to, with the at least one processor, cause, at least in part, the apparatus to receive data about a plurality of features for each of a plurality of points-of-interest. The apparatus is also caused to create, based on the respective features, a feature vector for each of the points-of-interest. The apparatus is further caused to generate a geospatial index comprising the feature vectors and associated location data for each of the points-of-interest.

According to another embodiment, a computer-readable storage medium carrying one or more sequences of one or more instructions which, when executed by one or more processors, cause, at least in part, an apparatus to receive data about a plurality of features for each of a plurality of points-of-interest. The apparatus is also caused to create, based on the respective features, a feature vector for each of the points-of-interest. The apparatus is further caused to generate a geospatial index comprising the feature vectors and associated location data for each of the points-of-interest.

According to another embodiment, an apparatus comprises means for receiving data about a plurality of features for each of a plurality of points-of-interest. The apparatus also comprises means for creating, based on the respective features, a feature vector for each of the points-of-interest. The apparatus further comprises means for generating a geospatial index comprising the feature vectors and associated location data for each of the points-of-interest.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention.

Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIGS. 5-7 are diagrams used to illustrate the mapping of features to feature vectors, according to various embodiments;

FIG. 9 is a diagram that illustrates segments of a weighting vector, according to one embodiment;

DESCRIPTION OF SOME EMBODIMENTS

Examples of a method, apparatus, and computer program for determining similar points-of-interest (POIs) for presentation based on feature vectors to a user are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
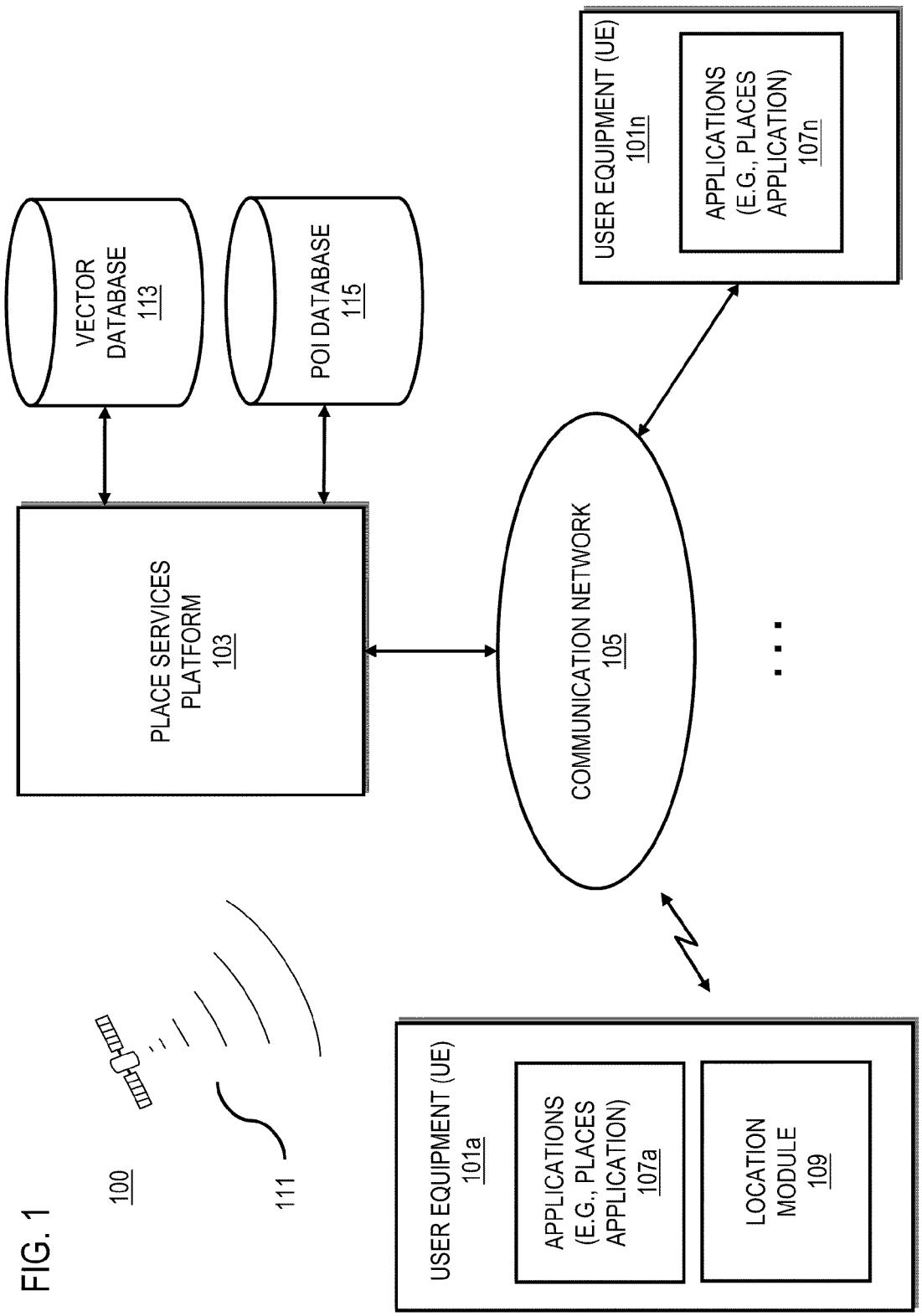
FIG. 1 is a diagram of a system capable of providing similar points-of-interest to a user based on a reference point-of-interest, according to one embodiment.

FIG. 1 is a diagram of a system 100 capable of determining similar POIs based on a reference POI, according to one embodiment. Location services such as navigation and local search services are increasingly being offered to users that may utilize these services using their user equipment (UE) 101. As mentioned, many location services require the user to input a variety of information to determine a local area search result. To bring these location services to the user the service provider can receive the user input, perform the search, and output results to the user. Users frequently select to use a service provider that retrieves correct search results in an efficient and convenient manner. However, it may be burdensome for a service provider to provide these services in an efficient and convenient manner because data about POIs may be structured in an awkward manner. Thus, there is a need for service providers to provide quick and efficient searches for location services that are convenient for a user to utilize.

In recognition of these needs, the system 100 of FIG. 1 introduces the capability to determine similar POIs based on a reference POI. In this manner, the user may conveniently choose a reference POI to view similar POIs nearby the user or nearby a location selected by the user on the user's UE 101. The UE 101 may then send a query to a place services platform 103 via a communication network 105 relaying a request for POIs similar to the reference POI in a particular region. Users can specify the parameters of the query using places applications 107a-107n on each user's respective UEs 101a-101n. A places application 107a on a particular UE 101a can retrieve the location of the user via a location module 109 of the UE 101a. The location module 109 can determine a position of the UE 101a using global positioning system (GPS) satellites 111, other triangulation systems, or other location determination technologies. Thus, in some scenarios, the user need only specify a reference POI to receive similar POIs to the reference POI in a certain region or nearby a certain location. The place services platform 103 may receive the information in a query from the UE 101 and prepare a response using a vector database 113 and a POI database 115.

The vector database 113 can store information about POIs using feature vectors and weighting vectors. In certain embodiments, a feature vector includes information about properties of POIs that may be used to determine similarity measures (e.g., a similarity score) of two POIs. Feature vectors can be created by mapping information associated with POIs to feature vector models as described in FIGS. 4-7. Feature vector models are data structures that allow for the vectors to be mapped to certain feature descriptions. Weighting vectors can be used to determine the similarity between two feature vectors. Weighting vectors can be determined by using training sets of similar feature vectors associated with POIs. Training sets of similar feature vectors are feature vectors that are associated with POIs that are predetermined to be similar. These training sets can be used as a basis in determining which features are more important and thus deserve more weight in determining similar POIs. Creation of weighting vectors is further described in FIG. 8.

The POI database 115 can include additional information about POIs. The information may include information that would be displayed to a user as a result of a local search, information that the user may find interesting, or other information that describes the POI. Examples of information that a user may find interesting or may be displayed to the user include information about categories describing the POI, ratings for the POI, a price associated with the POI, textual description of the POI, user reviews of the POI, appropriate dress code, contact information, and location information of the POI (e.g., address). Examples of other information that describes the POI can include GPS coordinates, mapping information, and information that could be useful in processing information about the POI.

In response to the query, the place services platform 103 can retrieve a feature vector associated with the reference POI from the vector database 113. The place services platform 103 may further retrieve data about other POIs in the specified search region from a POI database 115. Then, the place services platform 103 retrieves feature vectors of the other POIs from the vector database 113 and compares each of the feature vectors of the other POIs to the feature vector of the reference POI. From the comparison, the place services platform 103 is able to determine a similarity measure (e.g., a similarity score) of the similarity of each POI to the reference POI. Once similar POIs are found, the results can be provided to the user on the user's UE 101.

The UE 101 is any type of mobile terminal, fixed terminal, or portable terminal including a mobile handset, station, unit, device, multimedia computer, multimedia tablet, Internet node, communicator, desktop computer, laptop computer, Personal Digital Assistants (PDAs), or any combination thereof. It is also contemplated that the UE 101 can support any type of interface to the user (such as "wearable" circuitry, etc.). In one example, the UE 101 includes a location module 109 that can utilize one or more technologies for determining the UE's location. For instance, the location can be determined by a triangulation system such as a global positioning system (GPS), Assisted-GPS (A-GPS), Cell of Origin, WLAN triangulation, or other location extrapolation technologies. Standard GPS and A-GPS systems can use satellites 111 to pinpoint the location of a UE 101. A Cell of Origin system can be used to determine the cellular tower that a cellular UE 101 is synchronized with. This information provides a coarse location of the UE 101 because the cellular tower can have a unique cellular identifier (CellID) that can be geographically mapped. The location module 109 may also utilize multiple technologies to detect the location of the UE 101.

As shown in FIG. 1, the system 100 comprises the UE 101 having connectivity to the place services platform 103 via the communication network 105. By way of example, the communication network 105 of system 100 includes one or more networks such as a data network (not shown), a wireless network (not shown), a telephony network (not shown), or any combination thereof. It is contemplated that the data network may be any local area network (LAN), metropolitan area network (MAN), wide area network (WAN), a public data network (e.g., the Internet), or any other suitable packet-switched network, such as a commercially owned, proprietary packet-switched network, e.g., a proprietary cable or fiber-optic network. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), satellite, mobile ad-hoc network (MANET), and the like.

By way of example, the UE 101 and the place services platform 103 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application headers (layer 5, layer 6 and layer 7) as defined by the OSI Reference Model.

Figure 2:
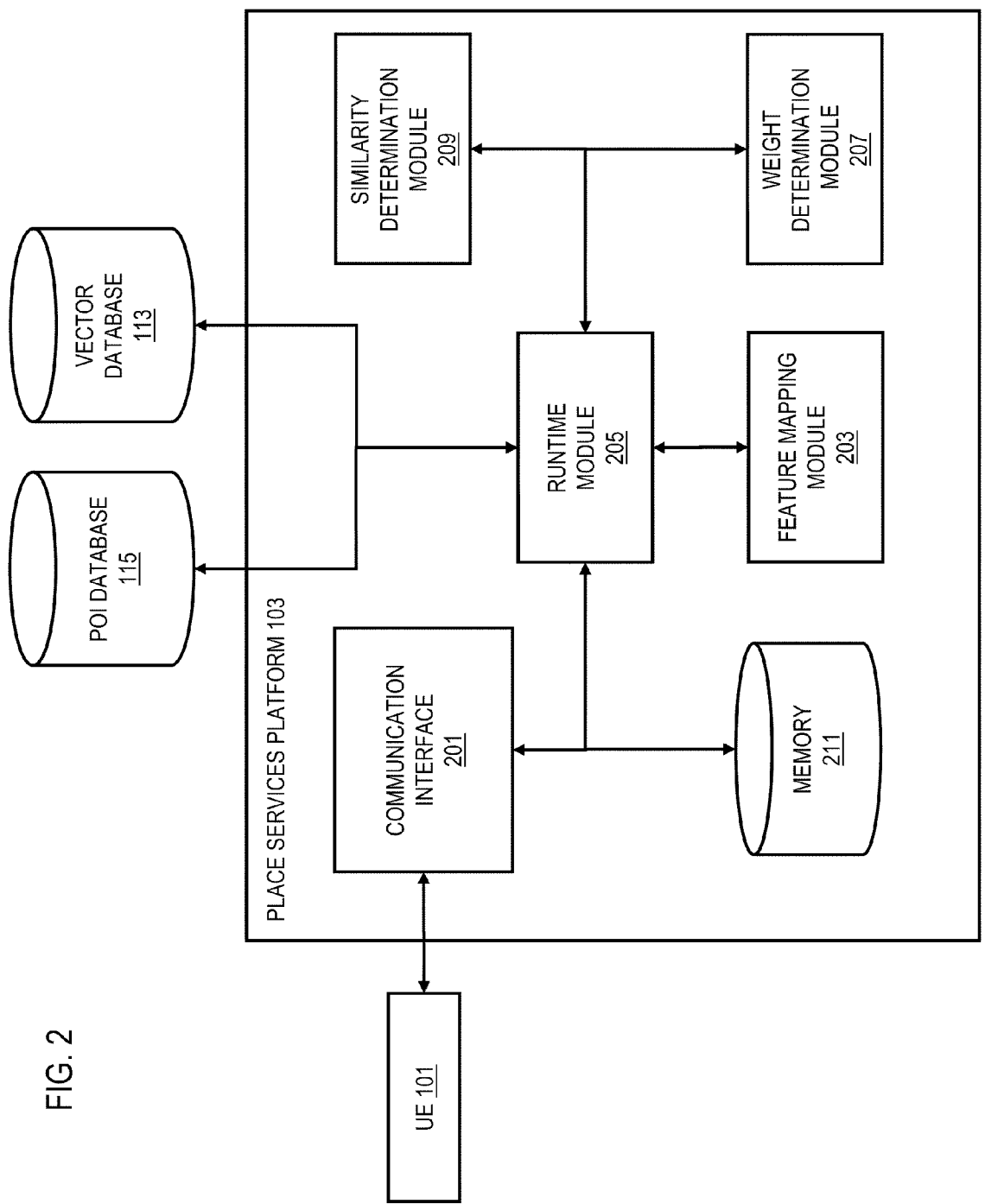
FIG. 2 is a diagram of the components of place services platform, according to one embodiment.

FIG. 2 is a diagram of the components of the place services platform 103, according to one embodiment. By way of example, the place services platform includes one or more components for determining similar POIs based on a reference POI. It is contemplated that the functions of these components may be combined in one or more components or performed by other components of equivalent functionality. In this embodiment, the place services platform 103 includes a communication interface 201 to communicate with UEs 101, a feature mapping module 203 to create and map features to feature vectors, a runtime module 205 to coordinate activities between other modules, a weight determination module 207 to determine weighting vectors, a similarity determination module 209 to determine a similarity measure between two feature vectors, and a memory 211.

As shown in FIG. 2, the place services platform 103 can include a communication interface 201. The communication interface 201 can be used to communicate with a UE 101. Certain communications can be via methods such as an internet protocol, messaging, or any other communication method (e.g., via the communication network 105). Other communications may be via other data interfaces, such as a bus for fiber channel connections to a database. In some examples, the UE 101 can send a query to the place services platform 103 via the communication interface 201. The place services platform 103 may then determine a response via the runtime module 205, store the response in the memory 211, and send a response to the UE 101 via the communication interface 201. Moreover, the communication interface 201 may be used to communicate with other service platforms that may contain information useful to the place services platform 103 and communication terminals that may be used to enter and update data.

As noted above, the feature mapping module 203 may be used to create and/or map features onto a feature vector for a new or updated POI associated with the place services platform 103. The feature mapping module 203 can map features such as categories, tags, ratings, price information, text description information, user review information, etc. to a feature vector associated with a POI as detailed in FIGS. 4-7. The feature mapping module 203 may be used by the runtime module 205 to control the mapping of the features of the POI to the feature vector of the POI. Under one scenario, the POI is new to the vector database 113. Under this scenario, POI information is retrieved from the POI database 115 and then features of the POI are mapped into the feature vector for the POI. Further, the mapping may be in response to an update by users utilizing a UE 101 and/or an administrator using a communication terminal. The feature vectors may be stored in the vector database 113.

Moreover, the runtime module 205 may utilize a weight determination module 207 to determine weights used to determine similarities between two feature vectors. The weight determination module 207 may be used to create weighting vectors and determine values for weighting vectors stored in the vector database 113. Under some scenarios, the weight vectors are created and associated with POIs based on training sets of feature vectors as further detailed in FIGS. 8 and 9. A training set can be a set of feature vectors that are considered to be similar. The weighting vector can be determined by increasing (reflecting that the similarity for the feature is important) the weighting for features that are common among the training set and decreasing the weighting for features that are uncommon among the training set. A weight in each associated weighting vector can be determined for each entry of the feature vectors.

In some embodiments, the similarity determination module 209 is used by the runtime module 205 to determine the similarity between two POIs based on their respective feature vectors. The similarity determination module 209 can receive a reference feature vector of a reference POI and another feature vector of another POI and determine a similarity score between the two feature vectors. In some embodiments, the similarity determination module 209 may additionally use a weighting vector associated with either the reference POI or the other POI to determine the similarity score. The similarity score under those embodiments may be determined by computing an inner vector product of the weighting vector (w), the reference feature vector (r), and the other feature vector (p). The similarity score (e.g., the weighted inner vector product) may be computed a by the following equation, where i=1 to the number of features associated with the vectors:

$$\text{similarity}(r, p) = \sum_i w_i r_i p_i$$

In this equation, the weighting vector, reference feature vector, and other feature vector have the same number of dimensions. As shown in the equation, the weighted inner product is the sum of all products of each single w, r, and p value.

Moreover, the similarity determination module 209 may be used to determine similarities between a reference POI and the other POI based on user data. User data of favorite places list of a particular user or user ratings of various POIs by the particular user may be used to determine similarity measures (e.g., a score). For example, additional points may be added to a determined weighted inner vector product score if the other POI is highly rated by the particular user or is in the particular user's favorite places list.

Figure 3:
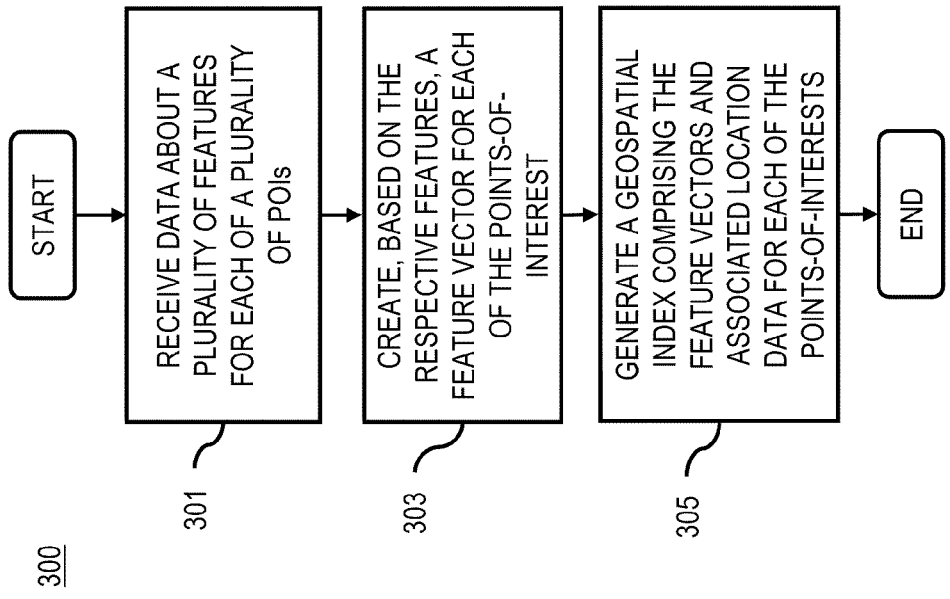
FIG. 3 is a flowchart of a process for determining similarities between points-of-interest using feature vectors, according to one embodiment.

FIG. 3 is a flowchart of a process for determining similarities between points-of-interest using feature vectors, according to one embodiment. In one embodiment, the runtime module 205 performs the process 300 and is implemented in, for instance, a chip set including a processor and a memory as shown FIG. 13. In step 301, the runtime module 205 receives data about a plurality of features for each of a plurality of POIs. The data may be received via the communication interface 201. Then, in step 303, the runtime module 205 creates, based on the respective features, a feature vector for each of the points-of-interest. The feature vectors can be created for each of the POIs and mapped using the processes detailed in FIGS. 4-7. The feature vectors may be created based on information gathered about the respective POIs. Feature vectors for different types of POIs (e.g., restaurants, landmarks, museums, etc.) may include different features. Each type of POI may have a feature vector of the same dimensions. As noted earlier, the feature vectors may be used to determine the similarity between two POIs, a reference POI and a similarity candidate POI.

Next, at step 305, the runtime module 205 generates a geospatial index including the feature vectors and associated location data for each of the points-of-interest. For example, a data structure for elements of the geospatial index may include a POI identifier, location data (e.g., GPS coordinates, longitude, latitude, etc.), and the feature vector associated with the POI. The geospatial index may be stored in the vector database 113. Further the geospatial index may be optimized for geospatial and similarity lookups so that similarity candidates in a search region may be quickly and efficiently determined. The optimizations may be completed by organization the geospatial index based on the location data. For example, POIs may be grouped together in the geospatial index based on regions or areas (e.g., the index may include subcomponents of regions that may include the POIs each stored with respective location data and respective the feature vector).

The above approach provides for the generation of a geospatial index of feature vectors that may be utilized to quickly retrieve and determine similar POIs to a reference POI. Further, feature vectors may include a fixed number of characteristics associated with the features vectors, thus providing a specified storage need for determining similarities between two POIs.

Figure 4:
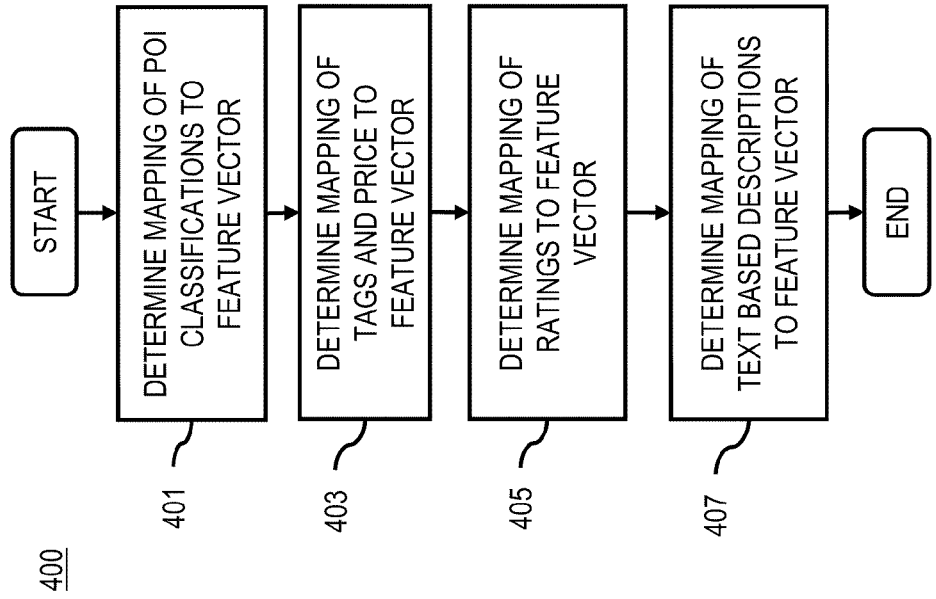
FIG. 4 is a flowchart of a process for mapping features of a point-of-interest to a feature vector associated with the point-of-interest, according to one embodiment.

FIG. 4 is a flowchart of a process for mapping features of a point-of-interest to a feature vector associated with the point-of-interest, according to one embodiment. In one embodiment, the runtime module 205 performs the process 400 and is implemented in, for instance, a chip set including a processor and a memory as shown FIG. 13. Mappings of various features may be mapped onto different POI types. The same feature vector model may be used for each POI type or different feature vector models may be used for each POI type. A POI type may be the highest level of classification of a POI. In certain embodiments, a feature vector model is a data structure outlining features without values entered for individual POI mappings. As noted above, features may include any information about a POI that may indicate similarities between two or more POIs. Exemplary features may include the mapping of classifications (e.g., categories) of the POIs, tagged associations with the POIs, a cost to go to the POI, ratings of the POI, and text-based descriptions. Features of individual POIs may be mapped onto feature vector models.

At step 401, the runtime module 205 maps POI classifications to the feature vector of a POI. The POI classifications can be based on a taxonomy associated with the POI. An exemplary taxonomy mapping structure is displayed in FIG. 5. The exemplary taxonomy mapping of FIG. 5 displays a component of the taxonomy specific to a Food and Drink 501 tree, however, other taxonomies and classifications for other POIs and POI types may be used. The classifications can be used to generate a classification portion of a feature vector model. The classifications may begin with more general POI information such as a type of POI (e.g., Food and Drink 501) and narrow to more specific classifications such as Restaurant 503 and Bar 505. Each classification node can include sub-categories that have more and more specific classifications. For example, the restaurant category can include an Asian category 507, an Italian category (not shown), or categories for different types of food. Moreover, the Asian category 507 may have additional subcategories such as Japanese 509, Thai 511, and Chinese 513. FIG. 5 also displays Place XYZ 515, a POI that can be mapped onto a feature vector 517. The feature vector 517 shows a description section which represents the feature vector model and a value that is mapped for each POI. A value may be set to 0 if the feature is not associated in Place XYZ 515 and 1 if the feature is associated with the POI. In certain embodiments, if a leaf node (e.g., Chinese 513) in the taxonomy is set to a value of 1, each node from the root (e.g., Asian 507, Restaurant 503, and Food and Drink 501) are also set to 1 because the available feature of the leaf node may inherently indicate that the nodes in the taxonomy are available features. The features may be mapped using conventional data entry techniques as well as by parsing information from a POI database 115. Additionally, these values may be updated by a user via a UE 101.

Figure 6:
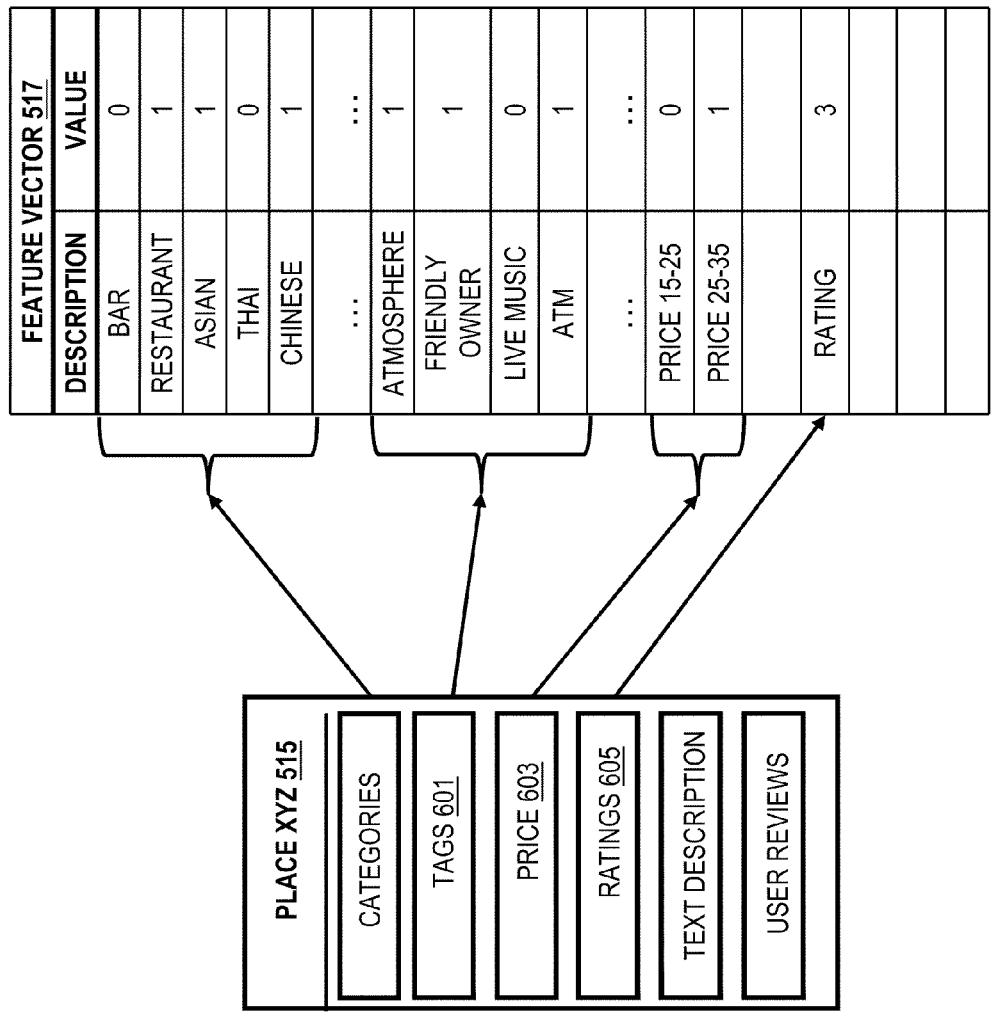
Figure 7:
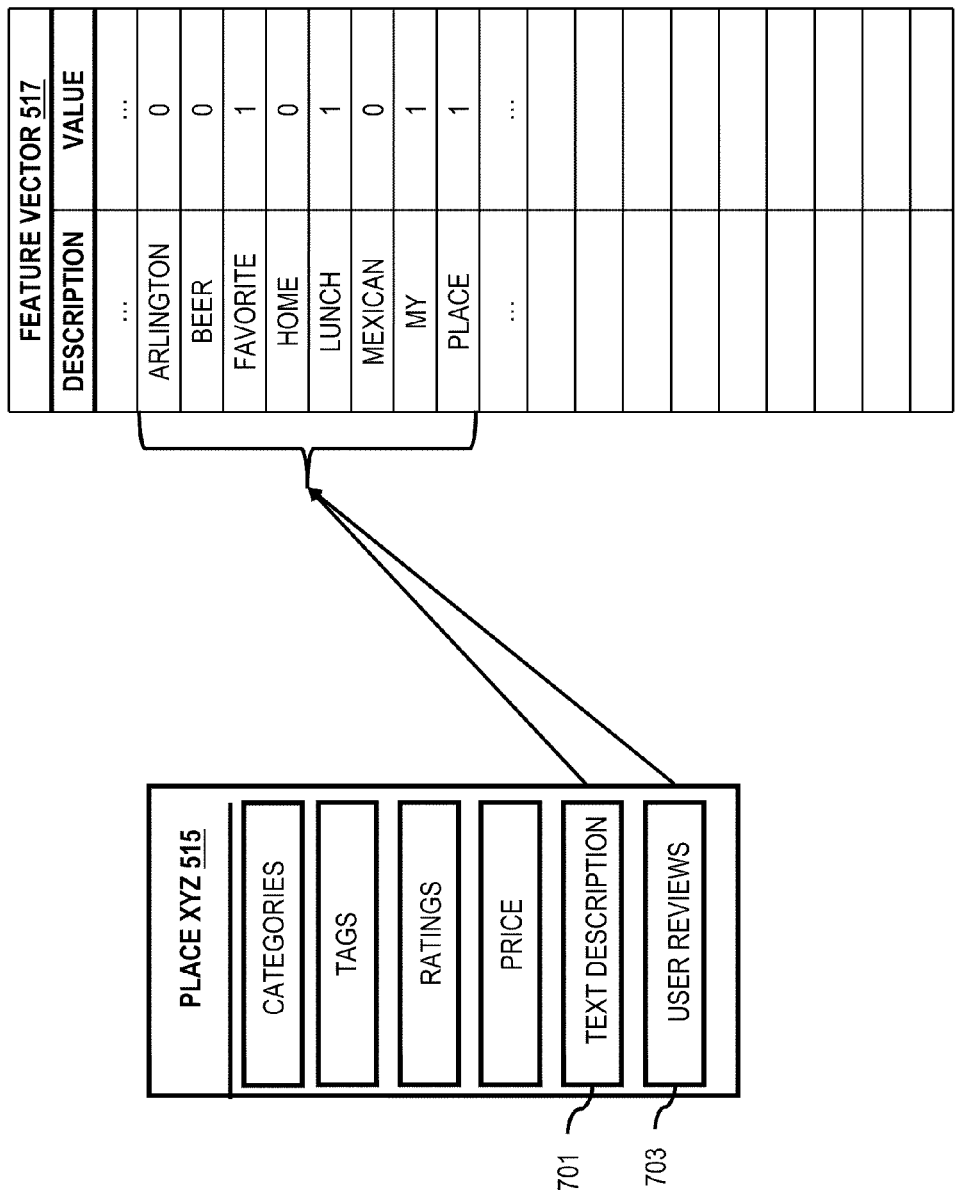

Then, at step 403, the runtime module 205 determines a mapping of tags and price to the feature vector. FIG. 6 displays an exemplary mapping of features of Place XYZ 515 to feature vector 517. As described above, the feature vector model for the tags and price features may include feature variables for various tags 601 and price ranges 603. For example, tags may indicate whether the POI has certain features, such as whether there is a nice atmosphere, a friendly owner, live music, an automated teller machine (ATM), restrooms, etc. As with the categorical mappings, the value for the individual tags 601 or price ranges 603 can be indicated by whether the POI is associated with the feature or not associated with the feature. Next, at step 405, the runtime module 205 determines mappings of ratings to the feature vector 517. The rating feature value can be based on ratings provided by users, by processing a POI database 115, or by data entry. The rating 605 can be a value such as an integer or floating point number or be based on categories associated with binary numbers like the pricing vector values.

The runtime module 205 can determine mappings of text based descriptions to the feature vector 517 (step 407). A mapping of text to a feature vector may be considered a vector space representation. A simple text mapping may set a text feature value to 1 if the text description 701 or user reviews 703 are determined to include the description string. For example, a string in a user review including "My favorite lunch place" associated with Place XYZ 515 may set the feature vector values of "favorite," "lunch," "my," and "place" to 1. Further, a language model (e.g., a model to associate different words based on word meaning, context, correlation, and the like) can be used to extract topics that may be useful in determining similarities between two POIs and generating entries in the feature vector for such topics. A language model assigns a probability to a given sequence of words and may be used to map a description into one or more semantic topics. Language models may be executed upon text descriptions 701 and user reviews 703 that are stored with the Place XYZ 515 to determine the associated feature vector 517. A topic model may set the value of a corresponding description (e.g., Arlington, beer, favorite, etc.) based on an abstraction of words. The abstraction of words is considered a topic. For example, a beer topic may be extracted from a grouping of various types of beers present in the textual description. Thus, a topic may be one or more terms that can be described using different words. Moreover, these vector space representations may be appended to the feature vector 517. In certain embodiments, these feature vector 517 variables may be included in each POI and values set to zero if the particular POI is not associated with those meanings. In another embodiment, different types of POIs (e.g., a food and drink POI, landmark POI, etc.) may utilize different sets of text description and user review meaning variables.

Figure 8:
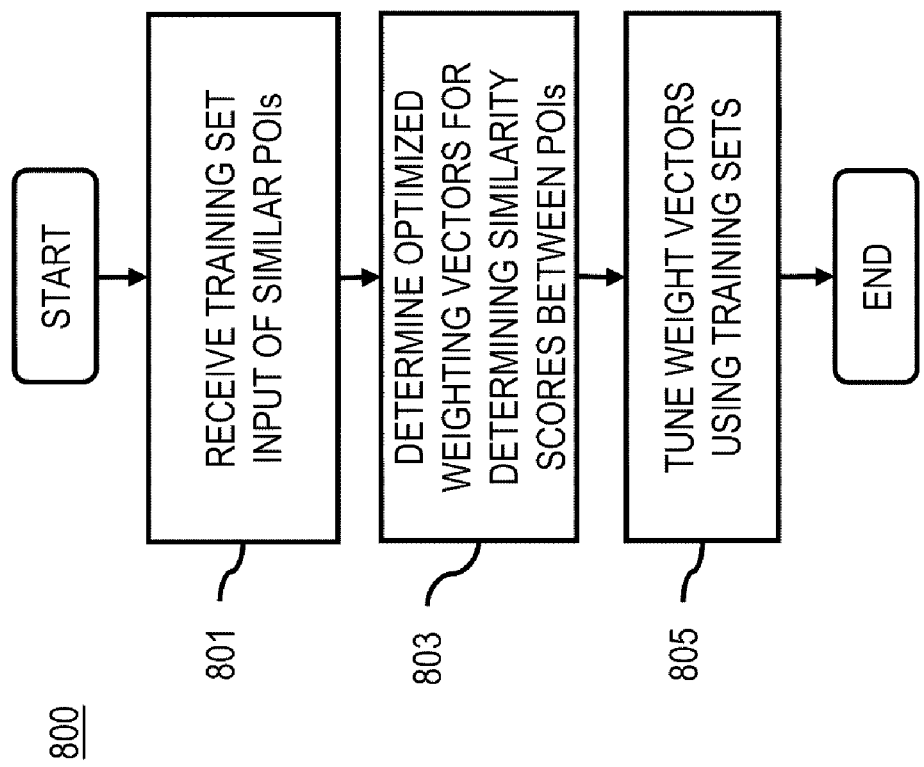
FIG. 8 is a flowchart of a process for determining weighting vectors used to determine similarity scores for points-of-interest, according to one embodiment.

FIG. 8 is a flowchart of a process for determining weighting vectors used to determine similarity scores for points-of-interest, according to one embodiment. In one embodiment, the runtime module 205 performs the process 800 and is implemented in, for instance, a chip set including a processor and a memory as shown FIG. 13. As noted above, weighting vectors may be used to determine the influence of score that should be associated with a particular feature. A weighting vector can be associated with a particular reference POI or a set of reference POIs.

In step 801, the runtime module 205 receives a training set (e.g., a pair of similar POIs) of input similar POIs. Feature vectors may already exist for the training set and be used to determine optimized weighting vectors for determining similarities between POIs (step 803). The elements of a weighting vector can be set in a way that a resulting similarity measure when comparing two feature vectors yield a large value for pairs of POIs that are considered similar and lower values for POIs that are considered to be different. Users of UEs 101 may mark certain POIs as similar. This information can be used to create or adjust a weighting vector. The training sets can be inputted into a machine learning algorithm. The algorithm can optimize the weights so that the similarity measure is large when similar POIs (e.g., marked by a user) are compared and scored smaller when random other POIs are compared. There may be a weight for each of the features of a feature vector. Additionally, the weighting vector may have the same number of elements (e.g., variables) as the feature vectors of the training set. Certain elements may be chosen to be more important by the machine learning algorithm (e.g., classification taxonomy elements). Moreover, the weights may be manually tuned (step 805). Groups of weighting vector features may be manually tuned to retrieve optimal results. An administrator using a communication terminal may have permissions to tune a weighting vector. Further, the administrator may also have permissions to associate a weighting vector with one or more feature vectors. When a feature vector is selected as a reference feature vector, the associated weighting vector may be used to determine a similarity score between the reference feature vector and feature vectors of other POIs.

FIG. 9 is a diagram that illustrates segments of a weighting vector 900, according to one embodiment. The first segment 901 can include weights for classifications of POIs. These features may be considered more important and attain greater weighting values because similar POIs generally have similar categorical features. Moreover, the tag segment 903 and text description segment 905 may indicate weights for tags or strings associated with POIs. These features may be weighted based on how adequate the features are to determine the similarity of POIs. For example, for certain POIs, live music may be granted greater importance than having an ATM. Moreover, a rating 907 may have a lesser weighting if actual values of ratings are used in the feature vectors. Moreover, certain price ranges 909 (e.g., more expensive price ranges) may be better suited for determining similarities than more common price ranges. Moreover, weightings may be based on a favorites list of the user or based on user ratings of a particular user. For example, weightings can be adjusted based on what a particular user considers to be good (e.g., is on the user's favorites list). A machine learning algorithm can take this information as input and adjust the weightings of certain features that are associated with the POIs on the favorites list to have a greater degree of influence on the scores.

Figure 10:
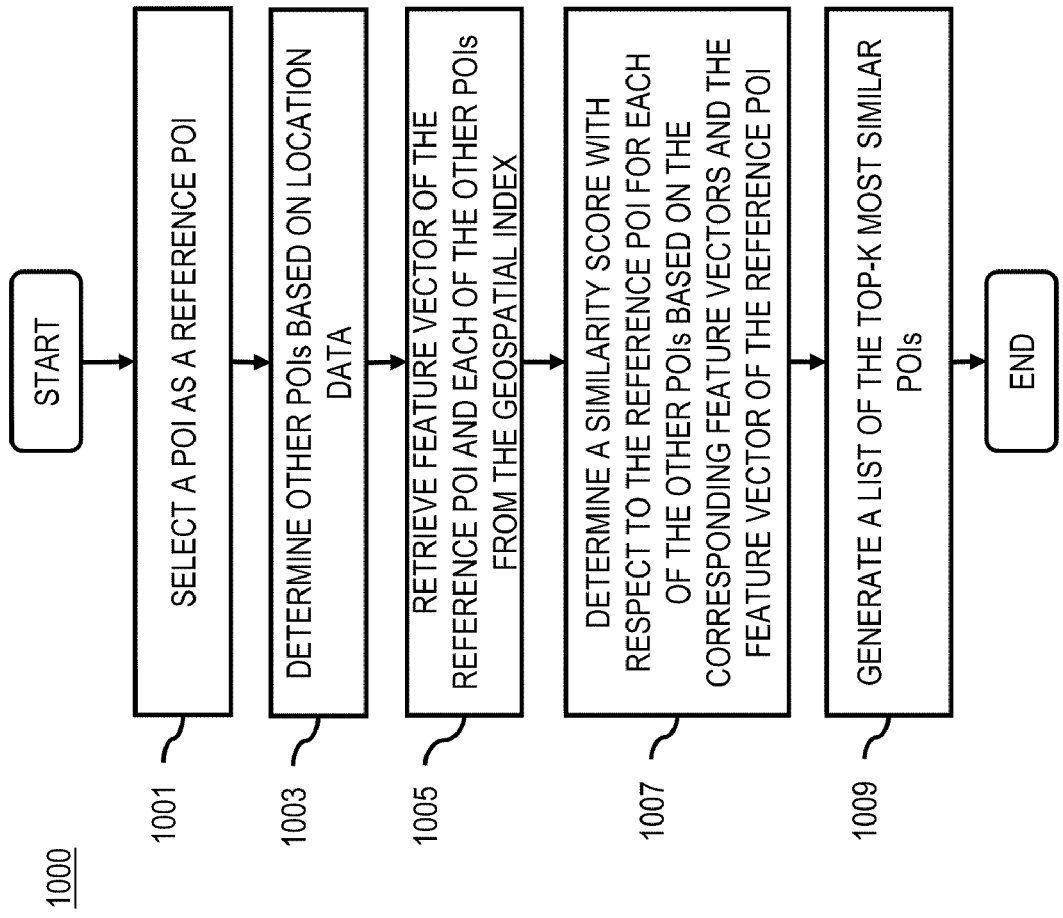
FIG. 10 is a flowchart of a process for determining the similarity between points-of-interest using feature vectors, according to one embodiment.

FIG. 10 is a flowchart of a process for determining the similarity between points-of-interest using feature vectors, according to one embodiment. In one embodiment, the runtime module 205 performs the process 1000 and is implemented in, for instance, a chip set including a processor and a memory as shown FIG. 13. At step 1001, a POI is selected as a reference POI. This reference POI can be selected based on an input from a UE 101 or by the runtime module 205 for another reason.

Then, at step 1003, the runtime module 205 determines other POIs based on location data that may be provided from the UE 101. The location data may include a search region to search for other POIs similar to the reference POI. Information about the POIs may be stored in a geospatial index. As described previously, in a geospatial index, the POIs may have location data (e.g., GPS coordinates, longitude, latitude, etc.) of the respective POIs stored with each of the POIs in a POI database 115 and/or a vector database 113. In the vector database 113, the POI location information can be stored in a data structure containing a POI identifier, the POI location data, and the feature vector associated with the POI. The location data may be used to determine POIs within a predetermined range of the location of the reference POI or a geographic region associated with a search for a similar POI. In one embodiment, the other POIs may be within the predetermined range or region. At step 1005, the runtime module 205 retrieves a feature vector of the reference POI and for candidate POIs that are within the geographic region.

Then, at step 1007, the runtime module 205 determines a similarity score with respect to the reference POI for each of the other POIs (e.g., candidate POIs) based on the corresponding feature vectors and the feature vector of the reference POI. In one embodiment, the similarity score can be determined based on a comparison of the corresponding feature vectors of the other POIs to the reference POI. In another embodiment, the similarity score can be determined using a weighting vector. The weighting vector can be generated by receiving training set inputs specifying feature vectors of similar POIs as detailed in the description of FIG. 8. In this embodiment, the similarity scores can be computed (e.g., by the similarity determination module 209 described above) using an inner vector product of the weighting vector, the feature vector of the reference POI, and the corresponding feature vector for each other POI. Moreover, once scores are determined for each of the other POIs, a list of the top-k most similar POIs to the reference POI within the predetermined range or region (step 1009) may be generated. The top-k most similar places may be a selection of a set of POIs with the greatest scores. The list may be used to determine similar POIs to display to users of the place services platform 103.

With the above approach, a service provider may utilize a vector database 113 and a POI database 115 to provide information about POIs to users based on a similarity between the POIs. Storing a geospatial index of information associated with POIs additionally allows for quick retrieval of similar POIs based on a search region for providing information to the users. Moreover, the use of feature vectors allows for an efficient approach for determining similar POIs based on a set of a fixed number of characteristics (e.g., the feature vectors), thereby limiting the amount of storage space required for determining the similarity between two POIs.

Figure 11:
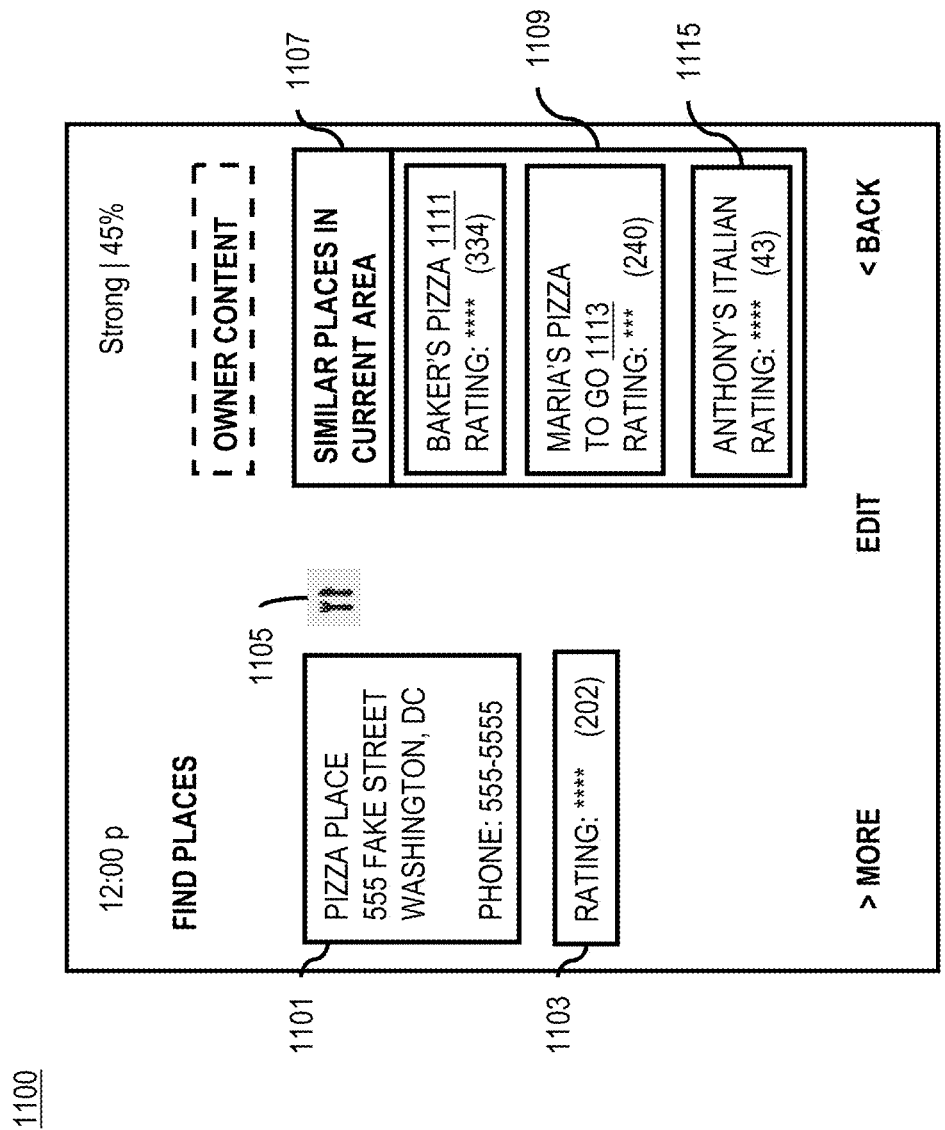
FIG. 11 is a diagram of a user interface utilized in the processes of FIGS. 3 and 10, according to one embodiment.

FIG. 11 is a diagram of a user interface 1100 utilized in the processes of FIGS. 3 and 10, according to one embodiment. The user interface 1100 can include various methods of communication. For example, the user interface 1100 can have outputs including a visual component (e.g., a screen), an audio component, a physical component (e.g., vibrations), and other methods of communication. User inputs can include a touch-screen interface, a scroll-and-click interface, a button interface, a microphone, etc. The user interface 1100 can be selected to view a selected place (e.g., Pizza place 1101). The user interface 1100 may display features associated with the place, such as ratings 1103, a type of establishment 1105, etc. The user may additionally select to view similar places in an area 1107 by making a selection. The selected place may be a reference POI in determining characteristics of the similar places. Further, the similar places can be associated with a location of the user and the user's UE 101. A similar places display 1109 can display similar places to the selected place. In this example, the displayed similar places (POIs) include Baker's Pizza 1111, Maria's Pizza to Go 1113, and Anthony's Italian 1115. These POIs can be selected for display based on feature vectors associated with each of the POIs. For example, the feature vectors associated with Baker's Pizza 1111, Maria's Pizza to Go 1113, and Anthony's Italian 1115 may have features similar to Pizza Place 1101, such as all may serve Pizza, all may have delivery service, etc. Additionally, Baker's Pizza 1111 and Maria's Pizza to Go 1113 may be more similar to Pizza Place than Anthony's Italian 1115 because Anthony's Italian's feature vector indicates that it serves a greater variety of food than Pizza Place 1101, Baker's Pizza 1111, and Maria's Pizza to go 1113.

The processes described herein for determining similar points-of-interest based on feature vectors may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 12:
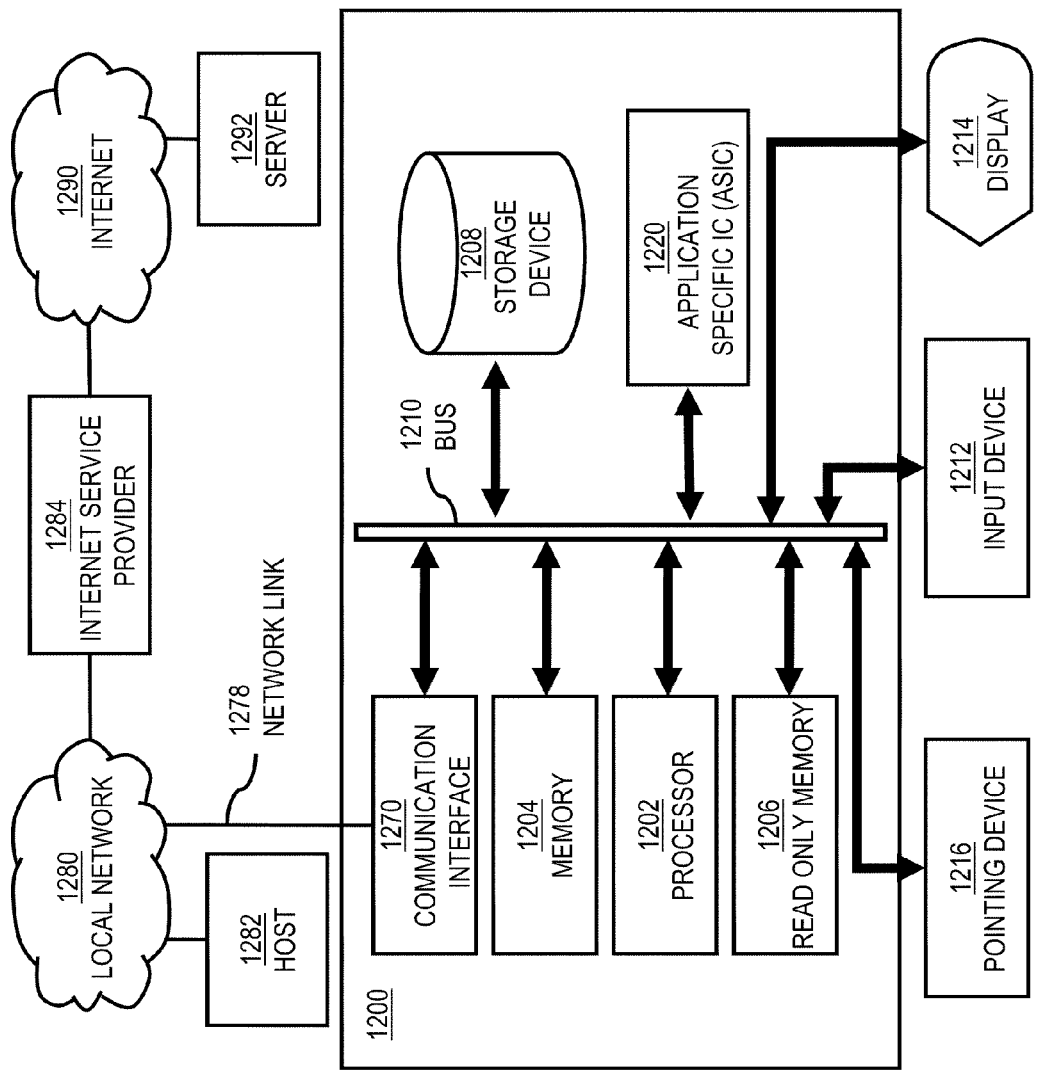
FIG. 12 is a diagram of hardware that can be used to implement an embodiment of the invention.

FIG. 12 illustrates a computer system 1200 upon which an embodiment of the invention may be implemented. Although computer system 1200 is depicted with respect to a particular device or equipment, it is contemplated that other devices or equipment (e.g., network elements, servers, etc.) within FIG. 12 can deploy the illustrated hardware and components of system 1200. Computer system 1200 is programmed (e.g., via computer program code or instructions) to determining similar points-of-interest based on feature vectors as described herein and includes a communication mechanism such as a bus 1210 for passing information between other internal and external components of the computer system 1200. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 1200, or a portion thereof, constitutes a means for performing one or more steps of determining similar points-of-interest based on feature vectors.

A bus 1210 includes one or more parallel conductors of information so that information is transferred quickly among devices coupled to the bus 1210. One or more processors 1202 for processing information are coupled with the bus 1210.

A processor 1202 performs a set of operations on information as specified by computer program code related to determining similar points-of-interest based on feature vectors. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1210 and placing information on the bus 1210. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1202, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 1200 also includes a memory 1204 coupled to bus 1210. The memory 1204, such as a random access memory (RAM) or other dynamic storage device, stores information including processor instructions for determining similar points-of-interest based on feature vectors. Dynamic memory allows information stored therein to be changed by the computer system 1200. RAM allows a unit of information stored at a location called a memory address to be stored and retrieved independently of information at neighboring addresses. The memory 1204 is also used by the processor 1202 to store temporary values during execution of processor instructions. The computer system 1200 also includes a read only memory (ROM) 1206 or other static storage device coupled to the bus 1210 for storing static information, including instructions, that is not changed by the computer system 1200. Some memory is composed of volatile storage that loses the information stored thereon when power is lost. Also coupled to bus 1210 is a non-volatile (persistent) storage device 1208, such as a magnetic disk, optical disk or flash card, for storing information, including instructions, that persists even when the computer system 1200 is turned off or otherwise loses power.

Information, including instructions for determining similar points-of-interest based on feature vectors, is provided to the bus 1210 for use by the processor from an external input device 1212, such as a keyboard containing alphanumeric keys operated by a human user, or a sensor. A sensor detects conditions in its vicinity and transforms those detections into physical expression compatible with the measurable phenomenon used to represent information in computer system 1200. Other external devices coupled to bus 1210, used primarily for interacting with humans, include a display device 1214, such as a cathode ray tube (CRT) or a liquid crystal display (LCD), or plasma screen or printer for presenting text or images, and a pointing device 1216, such as a mouse or a trackball or cursor direction keys, or motion sensor, for controlling a position of a small cursor image presented on the display 1214 and issuing commands associated with graphical elements presented on the display 1214. In some embodiments, for example, in embodiments in which the computer system 1200 performs all functions automatically without human input, one or more of external input device 1212, display device 1214 and pointing device 1216 is omitted.

In the illustrated embodiment, special purpose hardware, such as an application specific integrated circuit (ASIC) 1220, is coupled to bus 1210. The special purpose hardware is configured to perform operations not performed by processor 1202 quickly enough for special purposes. Examples of application specific ICs include graphics accelerator cards for generating images for display 1214, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1200 also includes one or more instances of a communications interface 1270 coupled to bus 1210. Communication interface 1270 provides a one-way or two-way communication coupling to a variety of external devices that operate with their own processors, such as printers, scanners and external disks. In general the coupling is with a network link 1278 that is connected to a local network 1280 to which a variety of external devices with their own processors are connected. For example, communication interface 1270 may be a parallel port or a serial port or a universal serial bus (USB) port on a personal computer. In some embodiments, communications interface 1270 is an integrated services digital network (ISDN) card or a digital subscriber line (DSL) card or a telephone modem that provides an information communication connection to a corresponding type of telephone line. In some embodiments, a communication interface 1270 is a cable modem that converts signals on bus 1210 into signals for a communication connection over a coaxial cable or into optical signals for a communication connection over a fiber optic cable. As another example, communications interface 1270 may be a local area network (LAN) card to provide a data communication connection to a compatible LAN, such as Ethernet. Wireless links may also be implemented. For wireless links, the communications interface 1270 sends or receives or both sends and receives electrical, acoustic or electromagnetic signals, including infrared and optical signals, that carry information streams, such as digital data. For example, in wireless handheld devices, such as mobile telephones like cell phones, the communications interface 1270 includes a radio band electromagnetic transmitter and receiver called a radio transceiver. In certain embodiments, the communications interface 1270 enables connection to the communication network 105 for determining similar points-of-interest based on feature vectors for the UE 101.

The term computer-readable medium is used herein to refer to any medium that participates in providing information to processor 1202, including instructions for execution. Such a medium may take many forms, including, but not limited to, non-volatile media, volatile media and transmission media. Non-volatile media include, for example, optical or magnetic disks, such as storage device 1208. Volatile media include, for example, dynamic memory 1204. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 1220.

Network link 1278 typically provides information communication using transmission media through one or more networks to other devices that use or process the information. For example, network link 1278 may provide a connection through local network 1280 to a host computer 1282 or to equipment 1284 operated by an Internet Service Provider (ISP). ISP equipment 1284 in turn provides data communication services through the public, world-wide packet-switching communication network of networks now commonly referred to as the Internet 1290.

A computer called a server host 1292 connected to the Internet hosts a process that provides a service in response to information received over the Internet. For example, server host 1292 hosts a process that provides information representing video data for presentation at display 1214. It is contemplated that the components of system 1200 can be deployed in various configurations within other computer systems, e.g., host 1282 and server 1292.

At least some embodiments of the invention are related to the use of computer system 1200 for implementing some or all of the techniques described herein. According to one embodiment of the invention, those techniques are performed by computer system 1200 in response to processor 1202 executing one or more sequences of one or more processor instructions contained in memory 1204. Such instructions, also called computer instructions, software and program code, may be read into memory 1204 from another computer-readable medium such as storage device 1208 or network link 1278. Execution of the sequences of instructions contained in memory 1204 causes processor 1202 to perform one or more of the method steps described herein. In alternative embodiments, hardware, such as ASIC 1220, may be used in place of or in combination with software to implement the invention. Thus, embodiments of the invention are not limited to any specific combination of hardware and software, unless otherwise explicitly stated herein.

The signals transmitted over network link 1278 and other networks through communications interface 1270, carry information to and from computer system 1200. Computer system 1200 can send and receive information, including program code, through the networks 1280, 1290 among others, through network link 1278 and communications interface 1270. In an example using the Internet 1290, a server host 1292 transmits program code for a particular application, requested by a message sent from computer 1200, through Internet 1290, ISP equipment 1284, local network 1280 and communications interface 1270. The received code may be executed by processor 1202 as it is received, or may be stored in memory 1204 or in storage device 1208 or other non-volatile storage for later execution, or both. In this manner, computer system 1200 may obtain application program code in the form of signals on a carrier wave.

Various forms of computer readable media may be involved in carrying one or more sequence of instructions or data or both to processor 1202 for execution. For example, instructions and data may initially be carried on a magnetic disk of a remote computer such as host 1282. The remote computer loads the instructions and data into its dynamic memory and sends the instructions and data over a telephone line using a modem. A modem local to the computer system 1200 receives the instructions and data on a telephone line and uses an infra-red transmitter to convert the instructions and data to a signal on an infra-red carrier wave serving as the network link 1278. An infrared detector serving as communications interface 1270 receives the instructions and data carried in the infrared signal and places information representing the instructions and data onto bus 1210. Bus 1210 carries the information to memory 1204 from which processor 1202 retrieves and executes the instructions using some of the data sent with the instructions. The instructions and data received in memory 1204 may optionally be stored on storage device 1208, either before or after execution by the processor 1202.

Figure 13:
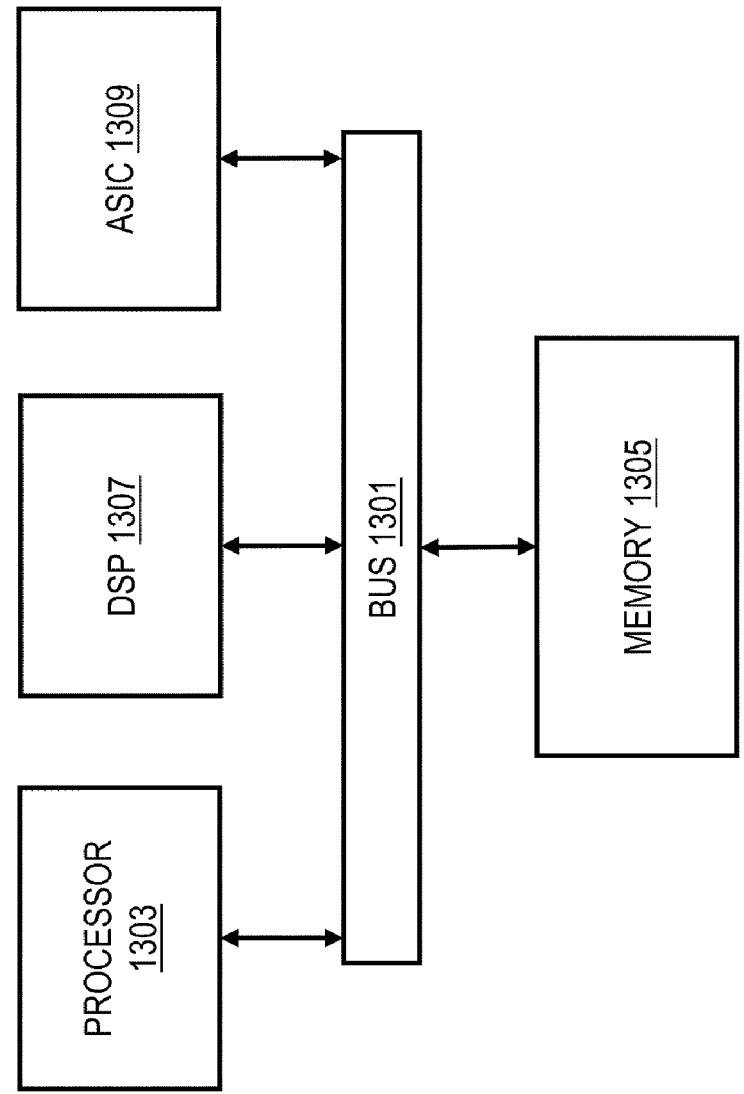
FIG. 13 is a diagram of a chip set that can be used to implement an embodiment of the invention.

FIG. 13 illustrates a chip set 1300 upon which an embodiment of the invention may be implemented. Chip set 1300 is programmed to determine similar points-of-interest based on feature vectors as described herein and includes, for instance, the processor and memory components described with respect to FIG. 12 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 1300, or a portion thereof, constitutes a means for performing one or more steps of determining similar points-of-interest based on feature vectors.

In one embodiment, the chip set 1300 includes a communication mechanism such as a bus 1301 for passing information among the components of the chip set 1300. A processor 1303 has connectivity to the bus 1301 to execute instructions and process information stored in, for example, a memory 1305. The processor 1303 may include one or more processing cores with each core configured to perform independently. A multi-core processor enables multiprocessing within a single physical package. Examples of a multi-core processor include two, four, eight, or greater numbers of processing cores. Alternatively or in addition, the processor 1303 may include one or more microprocessors configured in tandem via the bus 1301 to enable independent execution of instructions, pipelining, and multithreading. The processor 1303 may also be accompanied with one or more specialized components to perform certain processing functions and tasks such as one or more digital signal processors (DSP) 1307, or one or more application-specific integrated circuits (ASIC) 1309. A DSP 1307 typically is configured to process real-world signals (e.g., sound) in real time independently of the processor 1303. Similarly, an ASIC 1309 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1303 and accompanying components have connectivity to the memory 1305 via the bus 1301. The memory 1305 includes both dynamic memory (e.g., RAM, magnetic disk, writable optical disk, etc.) and static memory (e.g., ROM, CD-ROM, etc.) for storing executable instructions that when executed perform the inventive steps described herein to determine similar points-of-interest based on feature vectors. The memory 1305 also stores the data associated with or generated by the execution of the inventive steps.

Figure 14:
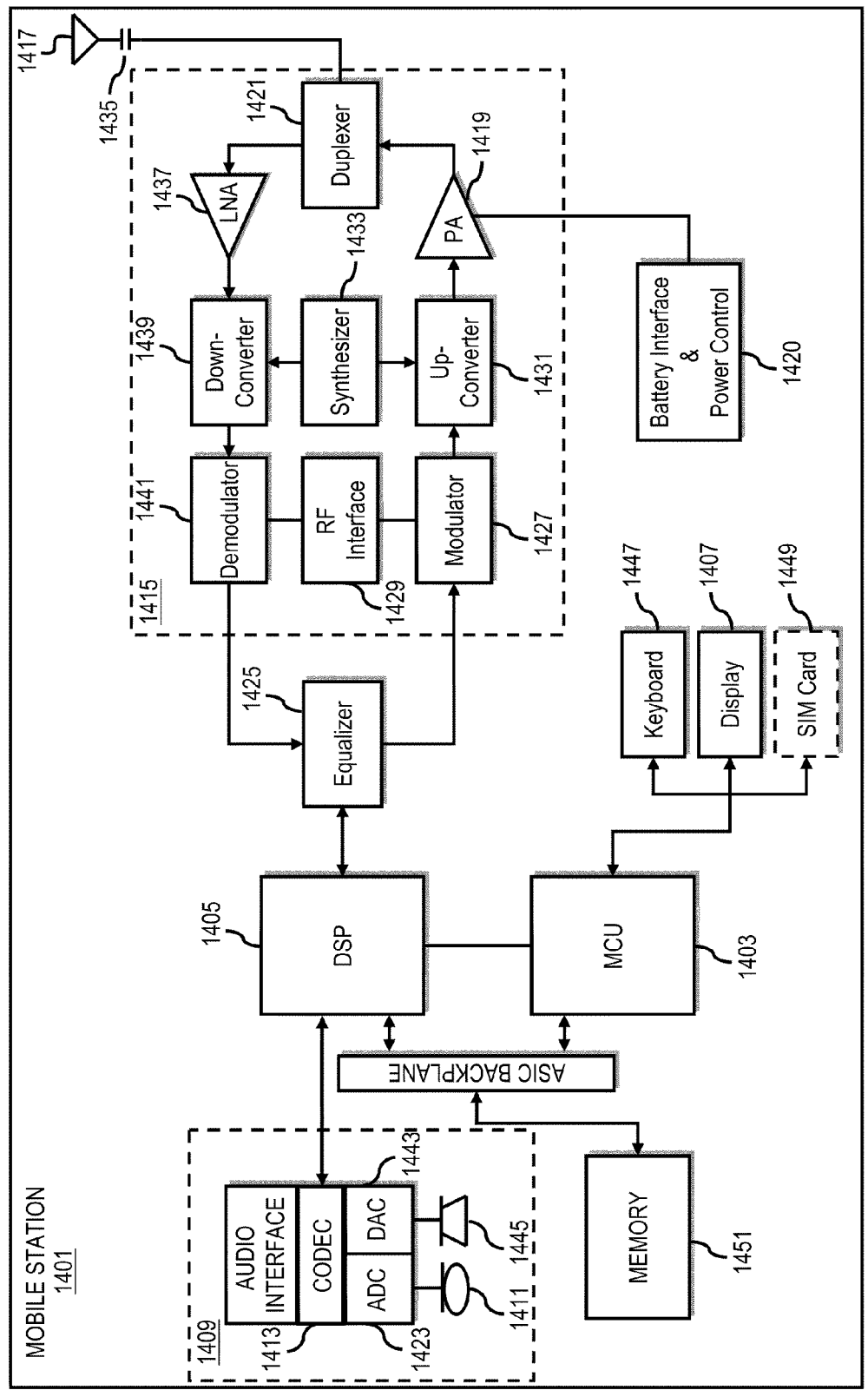
FIG. 14 is a diagram of a mobile terminal (e.g., handset) that can be used to implement an embodiment of the invention.

FIG. 14 is a diagram of exemplary components of a mobile terminal (e.g., handset) for communications, which is capable of operating in the system of FIG. 1, according to one embodiment. In some embodiments, mobile terminal 1400, or a portion thereof, constitutes a means for performing one or more steps of receiving information about or determining similar points-of-interest based on feature vectors. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1403, a Digital Signal Processor (DSP) 1405, and a receiver/transmitter unit including a microphone gain control unit and a speaker gain control unit. A main display unit 1407 provides a display to the user in support of various applications and mobile terminal functions that perform or support the steps of receiving information about or determining similar points-of-interest based on feature vectors. The display 14 includes display circuitry configured to display at least a portion of a user interface of the mobile terminal (e.g., mobile telephone). Additionally, the display 1407 and display circuitry are configured to facilitate user control of at least some functions of the mobile terminal. An audio function circuitry 1409 includes a microphone 1411 and microphone amplifier that amplifies the speech signal output from the microphone 1411. The amplified speech signal output from the microphone 1411 is fed to a coder/decoder (CODEC) 1413.

A radio section 1415 amplifies power and converts frequency in order to communicate with a base station, which is included in a mobile communication system, via antenna 1417. The power amplifier (PA) 1419 and the transmitter/modulation circuitry are operationally responsive to the MCU 1403, with an output from the PA 1419 coupled to the duplexer 1421 or circulator or antenna switch, as known in the art. The PA 1419 also couples to a battery interface and power control unit 1420.

In use, a user of mobile terminal 1401 speaks into the microphone 1411 and his or her voice along with any detected background noise is converted into an analog voltage. The analog voltage is then converted into a digital signal through the Analog to Digital Converter (ADC) 1423. The control unit 1403 routes the digital signal into the DSP 1405 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like.

The encoded signals are then routed to an equalizer 1425 for compensation of any frequency-dependent impairments that occur during transmission though the air such as phase and amplitude distortion. After equalizing the bit stream, the modulator 1427 combines the signal with a RF signal generated in the RF interface 1429. The modulator 1427 generates a sine wave by way of frequency or phase modulation. In order to prepare the signal for transmission, an up-converter 1431 combines the sine wave output from the modulator 1427 with another sine wave generated by a synthesizer 1433 to achieve the desired frequency of transmission. The signal is then sent through a PA 1419 to increase the signal to an appropriate power level. In practical systems, the PA 1419 acts as a variable gain amplifier whose gain is controlled by the DSP 1405 from information received from a network base station. The signal is then filtered within the duplexer 1421 and optionally sent to an antenna coupler 1435 to match impedances to provide maximum power transfer. Finally, the signal is transmitted via antenna 1417 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile terminal 1401 are received via antenna 1417 and immediately amplified by a low noise amplifier (LNA) 1437. A down-converter 1439 lowers the carrier frequency while the demodulator 1441 strips away the RF leaving only a digital bit stream. The signal then goes through the equalizer 1425 and is processed by the DSP 1405. A Digital to Analog Converter (DAC) 1443 converts the signal and the resulting output is transmitted to the user through the speaker 1445, all under control of a Main Control Unit (MCU) 1403—which can be implemented as a Central Processing Unit (CPU) (not shown).

The MCU 1403 receives various signals including input signals from the keyboard 1447. The keyboard 1447 and/or the MCU 1403 in combination with other user input components (e.g., the microphone 1411) comprise a user interface circuitry for managing user input. The MCU 1403 runs a user interface software to facilitate user control of at least some functions of the mobile terminal 1401 to receive information about or determine similar points-of-interest based on feature vectors. The MCU 1403 also delivers a display command and a switch command to the display 1407 and to the speech output switching controller, respectively. Further, the MCU 1403 exchanges information with the DSP 1405 and can access an optionally incorporated SIM card 1449 and a memory 1451. In addition, the MCU 1403 executes various control functions required of the terminal. The DSP 1405 may, depending upon the implementation, perform any of a variety of conventional digital processing functions on the voice signals. Additionally, DSP 1405 determines the background noise level of the local environment from the signals detected by microphone 1411 and sets the gain of microphone 1411 to a level selected to compensate for the natural tendency of the user of the mobile terminal 1401.

The CODEC 1413 includes the ADC 1423 and DAC 1443. The memory 1451 stores various data including call incoming tone data and is capable of storing other data including music data received via, e.g., the global Internet. The software module could reside in RAM memory, flash memory, registers, or any other form of writable storage medium known in the art. The memory device 1451 may be, but not limited to, a single memory, CD, DVD, ROM, RAM, EEPROM, optical storage, or any other non-volatile storage medium capable of storing digital data.

An optionally incorporated SIM card 1449 carries, for instance, important information, such as the cellular phone number, the carrier supplying service, subscription details, and security information. The SIM card 1449 serves primarily to identify the mobile terminal 1401 on a radio network. The card 1449 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
receiving data about a plurality of features for each of a plurality of points-of-interest;
creating, based on the respective features, a feature vector for each of the points-of-interest;
generating a geospatial index comprising the feature vectors and associated location data for each of the points-of-interest;
selecting one of the points-of-interest as a reference point-of-interest; and
determining, by a computer processor, a similarity score with respect to the reference point-of-interest for each of the other points-of-interest based on the corresponding feature vectors and the feature vector of the reference point-of-interest.

2. The method of claim 1, further comprising: receiving training set input specifying feature vectors of similar points-of-interest; and determining a weighting vector for use with the reference point-of-interest based on the training set.

3. The method of claim 2, wherein the respective similarity scores for each of the other points-of-interest is further based on the weighting vector.

4. The method of claim 3, wherein the respective similarity scores are determined by computing an inner vector product of the weighting vector, the feature vector of the reference point-of-interest and the corresponding feature vector for each other point-of-interest.

5. The method of claim 1, wherein the features include classification features, tag features, price features, ratings features, text-based description features, or a combination thereof.

6. The method of claim 1, wherein the features include text-based description features based on editorial content or user reviews.

7. An apparatus comprising:
at least one processor; and
at least one memory including computer program code,
the at least one memory and the computer program code configured to, with the at least one processor, cause the apparatus to perform at least the following,
receive data about a plurality of features for each of a plurality of points-of-interest;
create, based on the respective features, a feature vector for each of the points-of-interest;
generate a geospatial index comprising the feature vectors and associated location data for each of the points-of-interest;
select one of the points-of-interest as a reference point-of-interest; and
determine a similarity score with respect to the reference point-of-interest for each of the other points-of-interest based on the corresponding feature vectors and the feature vector of the reference point-of-interest.

8. The apparatus of claim 7, wherein the apparatus is further caused, at least in part, to:
receive training set input specifying feature vectors of similar points-of-interest; and determine a weighting vector for use with the reference point-of-interest based on the training set.

9. The apparatus of claim 8, wherein the respective similarity scores for each of the other points-of-interest is further based on the weighting vector.

10. The apparatus of claim 9, wherein the respective similarity scores are determined by computing an inner vector product of the weighting vector, the feature vector of the reference point-of-interest and the corresponding feature vector for each other point-of-interest.

11. The apparatus of claim 7, wherein the features include classification features, tag features, price features, ratings features, text-based description features, or a combination thereof.

12. The apparatus of claim 7, wherein the features include text-based description features based on editorial content or user reviews.

13. A computer-readable storage medium carrying one or more sequences of one or more instructions which, when executed by one or more processors, cause an apparatus to at least perform the following steps:
receiving data about a plurality of features for each of a plurality of points-of-interest;
creating, based on the respective features, a feature vector for each of the points-of-interest;
generating a geospatial index comprising the feature vectors and associated location data for each of the points-of-interest;
selecting one of the points-of-interest as a reference point-of-interest; and
determining a similarity score with respect to the reference point-of-interest for each of the other points-of-interest based on the corresponding feature vectors and the feature vector of the reference point-of-interest.

14. The computer-readable storage medium of claim 13, wherein the apparatus is caused, at least in part, to further perform:
receiving training set input specifying feature vectors of similar points-of-interest; and determining a weighting vector associated with the reference point-of-interest based on the training set.

15. The computer-readable storage medium of claim 14, wherein the respective similarity scores for each of the other points-of-interest is further based on the weighting vector.

16. The computer-readable storage medium of claim 15, wherein the respective similarity scores are determined by computing an inner vector product of the weighting vector, the feature vector of the reference point-of-interest and the corresponding feature vector for each other point-of-interest.

17. The computer-readable storage medium of claim 13, wherein the features include classification features, tag features, price features, ratings features, text-based description features, or a combination thereof.

* * * * *